United States Patent [19]
Davidson

[11] 3,948,046
[45] Apr. 6, 1976

[54] ANTI-POLLUTION DEVICE FOR TREATING EXHAUST FROM INTERNAL COMBUSTION ENGINES

[75] Inventor: George L. Davidson, Cincinnati, Ohio

[73] Assignee: Don F. Seyferth, LaQuinta, Calif.

[22] Filed: Sept. 23, 1974

[21] Appl. No.: 508,198

Related U.S. Application Data

[63] Continuation of Ser. No. 334,392, Feb. 21, 1973, abandoned.

[52] U.S. Cl. .................... 60/298; 23/288 F; 60/299
[51] Int. Cl.² .......................................... F01N 3/14
[58] Field of Search ............ 60/299, 320, 298, 288; 23/288 FR

[56] References Cited
UNITED STATES PATENTS

| | | | |
|---|---|---|---|
| 3,059,422 | 10/1962 | White | 60/298 |
| 3,110,300 | 11/1963 | Brown | 23/288 F |
| 3,236,044 | 2/1966 | Ruge | 60/288 |
| 3,477,227 | 11/1969 | Bettega | 60/298 |
| 3,545,201 | 12/1970 | Pedersen | 60/298 |
| 3,700,029 | 10/1972 | Thrun | 60/320 |
| 3,716,344 | 2/1973 | Ashburn | 60/298 |

FOREIGN PATENTS OR APPLICATIONS

| | | | |
|---|---|---|---|
| 864,775 | 3/1971 | Canada | 60/298 |

*Primary Examiner*—Douglas Hart
*Attorney, Agent, or Firm*—McDougall, Hersh & Scott

[57] ABSTRACT

An anti-pollution device for treatment of the gases exhausted from a fuel burning internal combustion engine which comprises a reactor housing through which the exhaust gases are circulated from an inlet to an outlet, means for admixing an oxygen containing gas with the exhaust gases during passage through the housing, means for cooling down the gaseous mixture whereby moisture condenses from the moisture vapor contained in the gaseous mixture to form an alkaline medium from the wet nitrogenous gases and in which surfaces contacted by the gaseous mixture under the conditions described within the housing are formed of a metal containing nickel, cobalt or other metal having a catalytic action to convert pollutants to their more highly oxidized state under the conditions to which the hot gaseous mixture is exposed within the housing.

17 Claims, 8 Drawing Figures

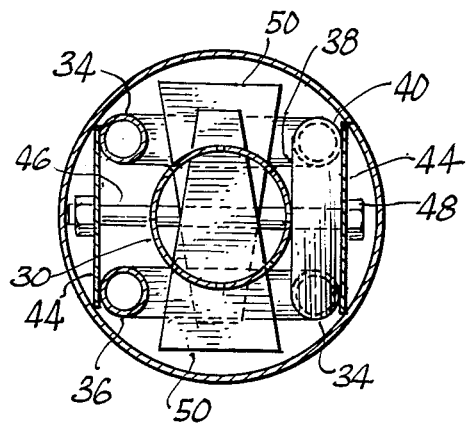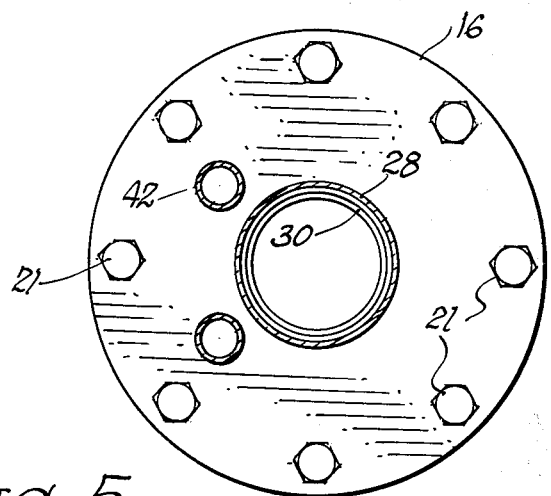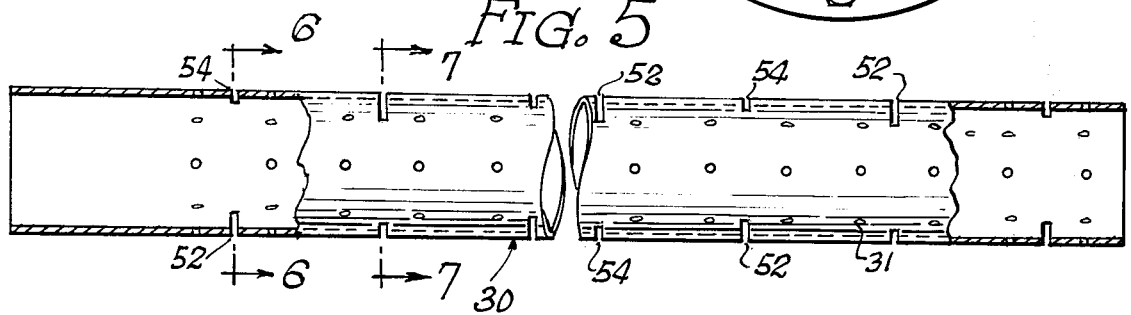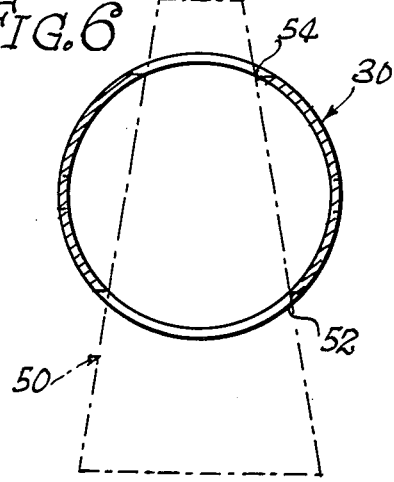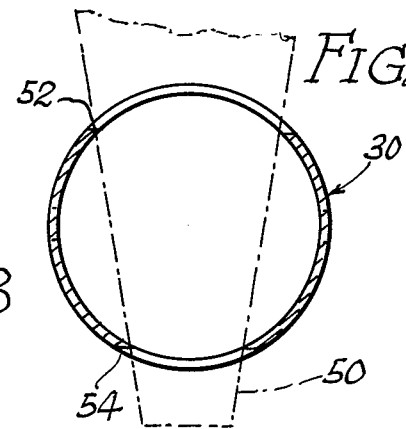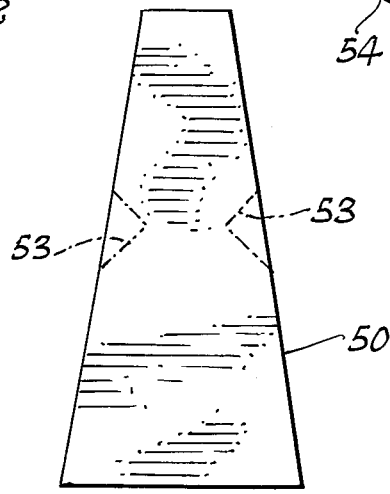

ANTI-POLLUTION DEVICE FOR TREATING EXHAUST FROM INTERNAL COMBUSTION ENGINES

This is a continuation of application Ser. No. 334,392 filed Feb. 21, 1973, and now abandoned.

FIELD OF THE INVENTION

This invention relates to an anti-pollution device mounted for treatment of gases exhausted from a fuel burning internal combustion engine.

DESCRIPTION OF THE PRIOR ART

The exhaust from an internal combustion engine is known to contain varying amounts of gases, such as unburned hydrocarbon, oxides of nitrogen such as nitrous oxide, and oxides of carbon, such as carbon monoxide, which tend to pollute the atmosphere.

The amount of pollution from engine exhaust gases has raised such problems in highly congested areas that regulation has been established to specify the maximum amount of pollutants permitted to be exhausted into the atmosphere. This has made it necessary to adopt means whereby combustion can be controlled to reduce the amount of pollutants that are formed to below the prescribed levels or whereby treatment of the exhaust gas is effected to reduce the amount of pollutants contained therein when exhausted into the atmosphere.

Control for more complete combustion in the engine can be employed to reduce the amount of pollution, but it is difficult to achieve and maintain the amount of reduction required to meet prescribed standards.

One approach has been the use of a reactor which embodies a catalyst, such as platinum on a suitable inert carrier for conversion of the nitrous oxides and carbon monoxides to their more highly oxidized state, such as described in the Keith et al U.S. Pat. No. 3,441,381. Catalytic reactors of the type described are relatively expensive and the catalyst used is subject to being poisoned rather quickly by components in the exhaust gases, such as lead compounds which are present from the burning of leaded gasolines.

Another approach has been the use of after-burners wherein hydrocarbons remaining in the exhaust ae burned for conversion to carbon dioxide in water while the nitrogen oxides and carbon monoxides are sought to be converted to their corresponding more highly oxidized derivatives, such as described in U.S. Pat. No. 3,214,246, No. 3,601,982, No. 3,696,619 and No. 3,706,535. Such after-burners require the further addition of fuel to achieve the necessary increase in temperature for combustion. Thus the use of an after-burner for pollution control of automotive exhaust gases requires a rather elaborate piece of equipment. It increases the amount of fuel consumption and it exhausts a hot gaseous into the atmosphere.

In a more recently issued U.S. Pat. No. 3,700,029, description is made of an ati-pollution device for exhaust gases which is provided in the form of a reaction chamber wherein the hot exhaust gases are reduced in temperature by heat exchange with a liquid coolant, and air is added with a view towards enhancing the conversion of oxidizable components in the exhaust gases during passage therethrough.

In order to achieve intermixing and the desired heat transfer, a rather elaborate arrangement of heat sinks and baffles are required to cause the gases to swirl as they pass through the reactor.

OBJECT OF THE INVENTION

It is an object of this invention to provide a simple and inexpensive unit which is capable of reducing the amount of pollutants exhausted from the exhaust of an internal combustion engine to well below present as well as future standards proposed by governmental agencies; which is simple in construction and easy in operation whereby utilization can be made with little if any expense in addition to initial cost; which is capable of efficient and effective operation over an extended period of time; which is not dependent upon any pretreatment of the gases exhausted from the internal combustion engine; which remains effective for use with engines substantially independently of the fuel that is being burned in the engine, so as to enable continued use of leaded fuels and the like, and which releases the exhaust gases into the atmosphere in a relatively cool state.

SUMMARY OF THE INVENTION

An important concept of this invention resides in the discovery that, before the hot gases issuing from a fuel burning internal combustion engine are released into the atmosphere, pollutants normally present in such exhaust gases can be materially reduced to safe and acceptable levels by treatment of the hot exhaust gases during passage through a reactor wherein the following conditions are maintained:

1. air or other oxygen containing gas is introduced into the reaction chamber for admixture with the exhaust gases during passage therethrough;

2. heat exchange members are provided in the path for engagement by the gaseous mixture during passage through the reaction chamber, the surface temperatures of which are within the range of about 200°–350°F to effect cool-down of the hot gases exhausted from the fuel burning internal combustion engine at a temperature of about 800°–1200°F, preferably to a temperature at which condensation of moisture will occur, especially on the heat exchange surfaces;

3. baffles are provided within the reaction chamber in the path of travel of the gaseous mixture to effect an amount of turbulence sufficient to maximize contact between the gaseous mixture and surfaces within the interior of the reaction chamber during passage of the gaseous mixture therethrough; and 4. a major portion, if not all, of the interior surfaces of the reactor, which are contacted by the exhaust gases during passage therethrough, are formed of a metal which is capable of resisting corrosion in the presence of hot exhaust gases to which they are exposed and which are formed to contain a metal which has catalytic effect under the conditions described for conversion of pollutants in the exhaust gases, as by oxidation of nitrous oxide (NO) and carbon monoxide (CO) to their more highly oxidized state such as nitrogen dioxide ($NO_2$) and carbon dioxide ($CO_2$), respectively, and conversion of volatile low carbon length hydrocarbons, such as $C_1$ to $C_5$ hydrocarbons to heavier hydrocarbons which do not volatilize off into the atmosphere.

For this purpose, it is preferred to make use of components formed of nickel, cobalt, chromium or alloys thereof but use can also be made of other metals and alloys thereof having the desired catalytic effect, such as tungsten, titanium, molybdenum, platinum and the like, and alloys thereof and mixtures thereof.

The reactor can be located beyond the combustion engine but before the muffler, or it can be located after the muffler but, in the preferred practice of the invention, it is desirable to locate the reactor immediately after the combustion engine and dispense entirely with the muffler and/or resonates.

DESCRIPTION OF THE DRAWINGS

FIG. 3 is a sectional view taken along the line 3-3 of FIG. 2;

FIG. 4 is an end view of the end cap;

FIG. 5 is an elevational view of the core tube; FIG. 6 is a sectional view taken along the line 6-6 of FIG. 5 showing the baffle plate assembly with the baffle in place;

FIG. 7 is a sectional view taken along the line 7—7 of FIG. 5 showing an adjacent baffle plate assembly with the baffle in place; and FIG. 8 is an elevational view of a modification in the baffle plate.

DESCRIPTION OF PREFERRED EMBODIMENT

Figure 1:
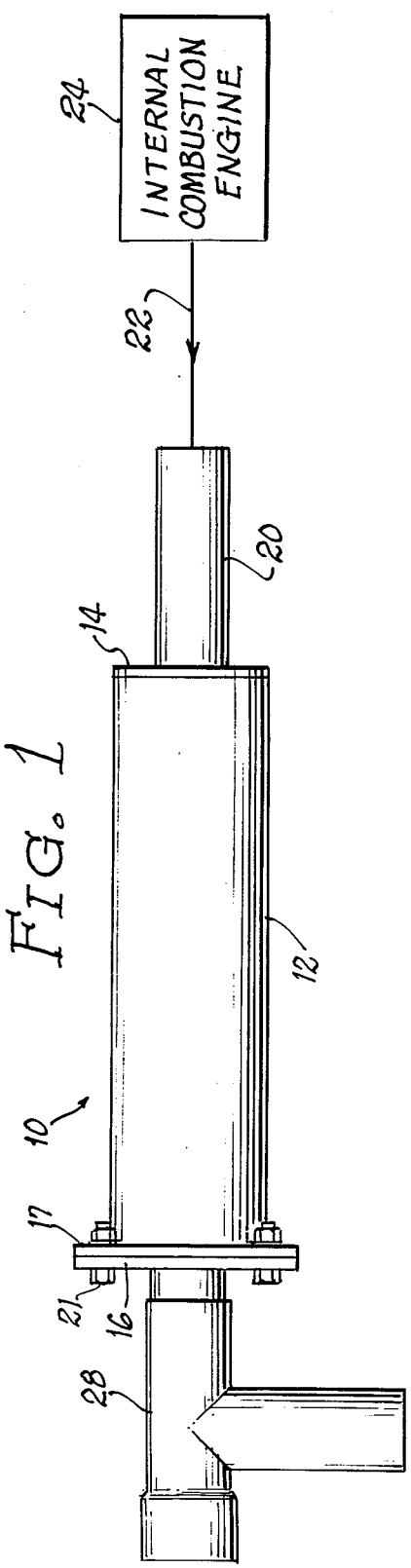
FIG. 1 is an elevational view showing the general arrangement of elements embodying the features of this invention.
Figure 2:
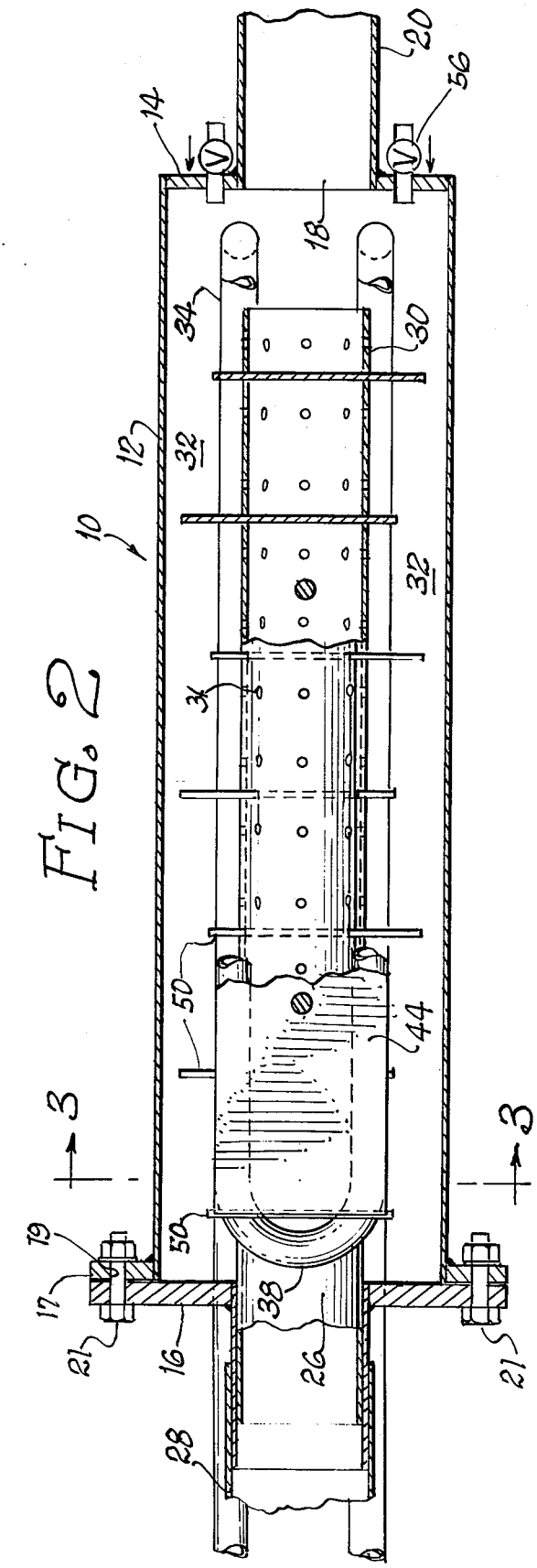
FIG. 2 is a schematic elevational view partially in section of the anti-pollution device representative of the practice of this invention adapted to be mounted in direct connection with the exhaust from a fuel burning internal combustion engine.

Having described the basic concepts of the invention, illustration will now be made of a reactor embodying the features of this invention, it being understood that the concepts described can be embodied in reactors in related or other designs.

In the illustrated modification, the reactor 10 is in the form of an elongate cylindrical member comprising a canister 12 closed at one end by an end plate 14 and at the other end by an end cap 16. The end plate 14 is provided with an inlet opening 18 fitted with a nipple 20 adapted to be connected to a pipe 22 which communicates directly, or through a muffler, with the exhaust from the combustion engine 24 for passage of the gases exhausted from the engine through the pipe and nipple into the interior of the canister. The end cap 16 is similarly provided with a central outlet opening 26 fitted with a T-tube 28 through which the gases exhaust from the reactor into the atmosphere, directly or through a muffler and/or resonator. Such muffler and resonator can be of the conventional type used in the automotive industry. For joinder of the canister to the end plate, an annular flange 17 is welded onto the end of the canister with circumferentially spaced apart openings 19 in the annular flange in registry with openings in the end plate for joinder one to the other by bolt and nut means 21.

Located concentrically within the canister is an elongate tubing, referred to as a core tube 30, having a diameter less than the diameter of the canister so as to provide an annular space 32 therebetween throughout the length of the core tube 30 within the canister 12. The core tube is dimensioned to have a length to extend continuously from the outlet opening 26 in the end cap 16 to a distance slightly less than the canister, so as to terminate a short distance inwardly of the end plate 14. The core tube engages the end cap in sealing relation about the outlet opening so that only gases passing through the core tube will exhaust from the reactor through the outlet opening. The core tube 30 is provided with small orifices 31 which extend therethrough substantially throughout the length of the core tube within the canister and about its entire circumference for intermixing the gases between the interior of the core tube and the annular space 32.

In the annular space 32, cooling coils 34 pass down and back along one side at 36, then across at 38, and down and back the opposite side at 40. The cooling coils enter and leave the canister through sealed openings 42 provided in the end cap with flexible tubing interconnecting the leads with a radiator (not shown) for circulation of the liquid coolant between the radiator and cooling coils through the interconnecting tubing. The radiator can be the same radiator employed for cooling the engine or another of similar construction.

Heat sinks, in the form of flat plates 44 of a high heat conductive metal, are arranged in pairs and spaced one from the other by interconnecting bolt and nut members 46 to embrace the outer walls of the cooling coils 34 positioned on opposite sides within the annular space 32. Thus the heat sinks serve as heat exchange surfaces for transfer of heat from the gaseous mixture to the cooling coils in exchange for cold from the coolant liquid circulated between the cooling coils and the radiator.

Baffle plates are provided intermittently along the length of the canister to extend into the annular space 32 as well as into the core tube 30 but without obstructing the space or passage through the core tube but sufficiently to interrupt laminar flow of the gases and to bring about turbulence for mixing the gases and maximizing contact with the surfaces within the canister. In the illustrated modification, such baffle members comprise flat plates 50 of trapezoidal shape supported by the core tube. For this purpose, the core tube is formed with longitudinally spaced pairs of diametrically opposed, cicumferential slots 52 and 54 with one slot in alternating pairs being dimensioned to have a width greater than the other in the pair, with the one slot dimensioned to have a width less than the maximum width at the base of the trapezoidal baffle plate but greater than the width at its apex, while the other slot is dimensioned to have a width greater than the width of the baffle plate at the apex, but with the opposite arrangement in the pairs of slots in between. As a result, the adjacent baffle plates can be inserted to extend through the slots from opposite directions and will be retained by the core tube in their assembled relation. As illustrated in FIG. 3, the supporting slotted portions are located in the circumferential portions of the core tube along an axis parallel with the heat sink plates so that the ends of the baffle plates will extend into the annular space in an area free of the cooling coils and heat sink members.

In the event of excessive pressure drop during passage of the gases through the reactor, one or more of the baffle plates can be formed with portions cut out to increase the open area through which the gases can flow, such as the V-shaped recesses 53, illustrated in the modification shown in FIG. 8. Baffle plates of other shapes and designs can be used. By way of further modification, the adjacent baffle plates can be arranged on angles less than 180° apart, such as at angles of 90° and the like.

Means are provided for admixture of air or other oxygen containing gas with the exhaust gases within the reaction chamber. For this purpose, openings 56 are provided in the end plate whereby the venturi action generated by the hot exhaust gases entering the reaction chamber, will draw air from the atmosphere through the opening into the chamber for admixture with the exhaust gases. The amount of air can be controlled by a suitable shutter or valve preferably limiting air flow only to one direction into the housing and which can be adjusted to vary the size of opening for the most efficient and effective ratio of air to gas for the particular fuel burning engine.

Best results are achieved when all of the internal surfaces within the canister including the surfaces of the core tube, baffle plates, heat sink plates and heat exchange coils, are formed of nickel, cobalt, chromium or metals or alloys containing nickel, cobalt or chromium, such as nonmagnetic stainless steels, or of other metals such as zirconium, tantalum, titanium and alloys containing such metals, which catalyze conversion reaction. However, it will be sufficient if only a portion of such surfaces are formed of stainless steels, nickel, cobalt or other such metals as described, or alloys thereof, or mixtures thereof, but it is preferred to have at least the heat sink plates and baffle plates formed of a metal containing such catalytic agent. Representative of stainless steels and alloys which are suitable are 304 stainless, 316 stainless, Inconal and Wasp alloy.

When use is made of water as the coolant liquid circulated between; the radiator and the cooling coils, it is important to incorporate an ingredient which will keep the aqueous medium in liquid form and prevent vapor formation in the cooling coils, especially along the interior surfaces thereof which are contacted along the opposite side by the hot gaseous mixture. For this purpose, use can be made of conventional anti-freeze compounds such as glycerols, glycols, diethylene glycol, triethylene glycol, and the like water soluble compounds, or the fluorinated, chlorinated ethylenes, as represented by the Freon marketed by E. I. duPont & Company. It is desirable to add enough of the boiling elevating liquid to raise the boiling point of the aqueous coolant to above the 200°–350°F range at which it is desirable to circulate the coolant liquid through the cooling coils.

In operation, the hot exhaust gases from the combustion engine enter the reaction chamber through the nipple 20 and the inlet 18. The pulsating rush of hot gases into the reaction chamber operate to draw air in a proportionate amount through the opening in the end plate 14. The gaseous mixture in the reaction chamber will normally take a flow path which passes into the annular space 32 about the core tube 30 for flow generally in the longitudinal direction through the annular space towards the end cap and, being blocked by the end cap, will pass in return flow through the annular space and finally enter the open end of the core tube, adjacent the inlet opening, for passage axially through the core tube for exhaust into the atmosphere. Such flow in opposite directions through the annular space, coupled with the effect of the baffle members which extend into the flow path of the gaseous mixture, brings about such tubulence as will cause the gases to sweep the surfaces and maximize intimate gas - metal surface contact. While some of the incoming gaseous mixture may pass directly into the axially aligned core tube for travel therethrough, the flow path will be interrupted sufficiently by the portions of the baffle plates extending across the path thereof as to achieve the desired time-temperature relationship as well as the turbulence necessary for sweeping the gases over the metal surfaces for maximizing heat exchange and catalytic action.

The following tests were performed on a 1973 Pontiac Grand Priz adjusted at the factory to meet existing Federal Regulation Gas Emission Standards of CVS-1 which are as follows:

| Hydrocarbon grams/mile | Carbon Monoxide grams/mile | Oxide of Nitrogen grams/mile |
|---|---|---|
| 3.2 | 39 | 3.0 |

Without making any change in the carburetion, an anti-pollution device of the type described was mounted to receive the exhaust directly from the engine. In the device of this invention, the canister, formed of 316 stainless steel, had an inside diameter of 4 inches and a length of 16 inches. The core tube, also formed of 316 stainless steel, had an outside diameter of 1⅞ inches and a length of 15 inches extending within the canister. Use was made of seven baffles spaced on 2 inch centers. The baffles, heat sinks and cooling coil were also formed of 316 stainless steel. After steady operation to stabilize conditions, the emission was tested by a standard testing laboratory with the following results:

| Hydrocarbon grams/mile | Carbon Monoxide grams/mile | Oxide of Nitrogen grams/mile |
|---|---|---|
| 1.2 | 4.7 | .72 |

A separate test was made after the carburetor seal had been broken and the carburetion adjusted for a leaner mixture, with the following results:

| Hydrocarbon grams/mile | Carbon Monoxide grams/mile | Oxide of Nitrogen grams/mile |
|---|---|---|
| .62 | 3.2 | .52 |

It wll be seen from the above that a 5 to 10 fold reduction in emission of pollution gases was achieved by the use of the device described without otherwise modifying the operation of the engine. A further 25–50% reduction was achieved when the carburetion was adjusted for a leaner mixture. The emissions obtained by utilization of a pollution device embodying the features of this invention were low enough to meet Federal standards set for 1975 and beyond.

The 316 stainless steel used in the reactor described contains 18% by weight chromium, 22% by weight nickel, about 2.4% by weight titanium and 2.3% by weight molybdenum as the principal alloying elements with iron. Equivalent results have been secured with 304 stainless having the following analysis:

| | |
|---|---|
| Carbon | 0.08 |
| Magnesium | 2.0 |
| Silicon | 1.0 |
| Phosphorus | 0.45 |
| Sulphur | 0.03 |
| Chromium | 17–20 |
| Nickel | 12.0 |

-continued

Remainder iron, plus impurities

It will be apparent from the forgoing that there is provided a simple, inexpensive and effective anti-pollution device which can be mounted to treat the exhaust from a fuel burning internal combustion engine materially to reduce the amount of pollutants exhausted into the atmosphere.

It will be understood that two or more units of the type described can be employed in series or in parallel arrangement for sequential treatment of the gases exhausted from the fuel burning combustion engine or for treatment in parallel of subdivided portions of said exhaust gases.

It will be further understood that changes may be made in the details of construction, formulation and operation without departing from the spirit of the invention, especially as defined in the following claims.

I claim:

1. An anti-pollution device for treatment of gases exhausted from a fuel burning internal combustion engine comprising a reactor housing having an inlet through which the hot exhaust gases are introduced into the housing and an outlet through which the treated gases are issued from the housing for release into the atmosphere, a core tube having an outlet and an inlet mounted within the housing to extend lengthwise through the housing with the outlet of the core tube being connected in sealing relation with the outlet of the housing so that only gases passing through the core tube will exhaust from the housing while the inlet of the core tube is open and in axially spaced facing relation with the inlet of the housing, with the core tube having a cross-section less than that of the interior of the housing to provide a spaced relation therebetween whereby the exhaust gases entering the housing through the inlet can flow into the open end of the core tube and about the core tube for passage through the core tube to the outlet, means for admixture of an oxygen containing gas with the hot exhaust gases introduced into the housing, temperature reduction means comprising heat transfer surfaces in the form of cooling coils within the housing in the path to be engaged by the gaseous mixture during passage through the housing from the inlet to the outlet, and means for circulating a fluid coolant through the cooling coils, baffles within the core tube and housing in the path of travel of the gaseous mixture through the core tube and housing to bring about turbulent flow for maximizing contact between the gaseous mixture and the exposed surfaces within the interior of the housing, at least a portion of said surfaces containing a metal which functions as a catalyst under the conditions existing within the housing to convert gaseous components of a lower oxidized state to a higher oxidized state.

2. An anti-pollution device for treatment of gases exhausted from a fuel burning internal combustion engine comprising a reactor housing having an inlet through which the hot exhaust gases are introduced into the housing and an outlet through which the treated gases are issued from the housing for release into the atmosphere, a core tube mounted within the housing to extend lengthwise through the housing and connected at one end to the outlet while the other end is open and in spaced facing relation with the inlet, with the core tube having a cross-section less than that of the interior of the housing to provide a spaced relation therebetween whereby the exhaust gases entering the housing through the inlet can flow into the open end of the core tube and about the core tube for passage through the core tube to the outlet, means for admixture of an oxygen containing gas with the hot exhaust gas introduced into the housing, heat transfer surfaces for cool-down of the hot gases during passage through the housing, baffles within the housing in the path of travel of the gaseous mixture through the housing to bring about turbulent flow for maximizing contact between the gaseous mixture and the exposed surfaces within the interior of the housing, at least a portion of said surfaces containing a metal which functions as a catalyst under the conditions existing within the housing to convert gaseous components of a lower oxidized state to a higher oxidized state, in which the baffles comprise metal members supported in longitudinally spaced apart relation by the core tube with the outer portions of the baffles extending into the annular space with intermediate portions extending across the interior of the core tube with the portions extending across the core tube having a cross-section less than the core tube to provide open spaces therebetween through which the gaseous mixture may pass.

3. An anti-pollution device as claimed in Claim 1 in which the reactor housing comprises a tubular member having the inlet at one end and the outlet at the other.

4. An anti-pollution device as claimed in claim 1 in which the means for admixture of an oxygen containing gas with the hot exhaust gases introduced into the housing comprises means adjacent the inlet for the introduction of the oxygen containing gases as they enter the housing.

5. An anti-pollution device as claimed in claim 1 in which the oxygen containing gas is air.

6. An anti-pollution device as claimed in claim 5 in which the means for introducing air into the housing comprises passages through the housing adjacent the inlet and in communication with the outside atmosphere whereby air is drawn into the housing from the outside atmosphere by sub-atmospheric conditions generated as the hot exhaust gases enter the housing through the inlet.

7. An anti-pollution device as claimed in claim 1 in which the heat transfer means comprises cooling coils within the housing through which a liquid coolant is circulated and radiators for cool-down of a liquid coolant and which includes a tubular member interconnecting the cooling coils and radiators for circulation of a liquid coolant therebetween.

8. An anti-pollution device as claimed in claim 7 in which the liquid coolant comprises water and an amount of water soluble liquid which raises the boiling point of the resulting aqueous medium to a level sufficient to prevent vaporization at the temperatures of the walls of the cooling coils through which the liquid coolant is circulated.

9. An anti-pollution device as claimed in claim 8 in which the boiling point of the aqueous medium is raised to above 250°F.

10. An anti-pollution device as claimed in claim 8 in which the boiling point of the aqueous medium is raised to above 350°F.

11. An anti-pollution device as claimed in claim 8 in which the material for raising the boiling point of the water is selected from the group consisting of gycerol, a glycol, and a fluorinated, chlorinated hydrocarbon of low carbon length.

12. An anti-pollution device as claimed in claim 1 in which the core tube is dimensioned to have a length extending into the housing slightly less than the length of the housing.

13. An anti-pollution device as claimed in claim 2 in which the metal baffle members are of trapezoidal shape and the means for supporting the baffle in the mounted relation by the core tube comprises diametrically opposed pairs of slots spaced longitudinally along the core tube with one slot of the pair being of larger dimension than the other but less than the base of the trapezoidal baffle member while the smaller slot is dimensioned to be greater than the dimension of the trapezoidal baffle at its apex so that the baffle plate can extend through the crosswise aligned pairs of slots with outer portions extending outwardly into the annular space.

14. An anti-pollution device as claimed in claim 1 which includes metal plates mounted within the housing in surface contact with the cooling coils and which function as heat sinks for enhancing heat exchange between the hot gaseous mixture and the cooling coils.

15. An anti-pollution device as claimed in claim 14 in which the cooling coils extend as diametrically opposed interconnected banks in the housing and the heat sink plates comprise flat plate members arranged in parallel relation spaced one from the other by an amount to embrace the cooling coils therebetween.

16. An anti-pollution device as claimed in claim 1 in which at least a portion of the surfaces within the housing comprise a metal selected from the group consisting of nickel, cobalt, chromium titanium, tungsten, molybdenum, high nickel, cobalt or chromium stainless steels and alloys thereof and mixtures thereof.

17. An anti-pollution device as claimed in claim 16 in which all of the surfaces including the cooling coils, heat sink plates, baffle plates and core tubes are formed of the metal as claimed in claim 16.

* * * * *